United States Patent [19]
De Lord

[11] 3,754,782
[45] Aug. 28, 1973

[54] CORNER DEVICE FOR DUCT JOINTS
[75] Inventor: Ernest P. De Lord, Prospect Heights, Ill.
[73] Assignee: Cleats Mfg. Inc., Chicago, Ill.
[22] Filed: June 18, 1971
[21] Appl. No.: 154,284

[52] U.S. Cl. .............................. 285/424, 285/404
[51] Int. Cl. .......................................... F16l 25/00
[58] Field of Search................. 285/229, 331, 365, 285/366, 367, 407, 408, 409, 410, 411, 424, 404; 287/189.36 H

[56] References Cited
UNITED STATES PATENTS

| | | | |
|---|---|---|---|
| 3,630,549 | 12/1971 | Grimm | 285/424 X |
| 1,967,467 | 7/1934 | Damsel | 285/365 X |
| 2,126,499 | 8/1938 | Petersen | 285/424 X |
| 1,654,293 | 12/1927 | Lamm | 287/189.36 H X |
| 2,491,700 | 12/1949 | Zwerling | 285/424 X |
| 3,460,859 | 8/1969 | Keating | 285/424 X |
| 3,482,861 | 12/1969 | Keating | 285/424 X |

FOREIGN PATENTS OR APPLICATIONS 904,639   8/1962   Great Britain...................... 285/331

Primary Examiner—Mervin Stein
Assistant Examiner—David H. Corbin
Attorney—Richard D. Mason, Philip C Peterson et al.

[57] ABSTRACT

A corner device for connecting together rectangular ducts in end-to-end relation across a transverse joint comprising angle means adapted to extend longitudinally of the ducts along a corner and across the joint. The angle means includes a pair of flanges adapted to extend along interconnecting walls of the ducts, and each flange has inside end surfaces at opposite ends adapted to be attached to an adjacent duct wall. Corner rib means extends transversely of said angle means outwardly of the flanges away from the duct walls along the joint and includes a rib receiving recess defined therein for receiving an end portion of a joint connector used for interconnecting the adjacent edges of the duct walls.

3 Claims, 4 Drawing Figures

Patented Aug. 28, 1973
3,754,782
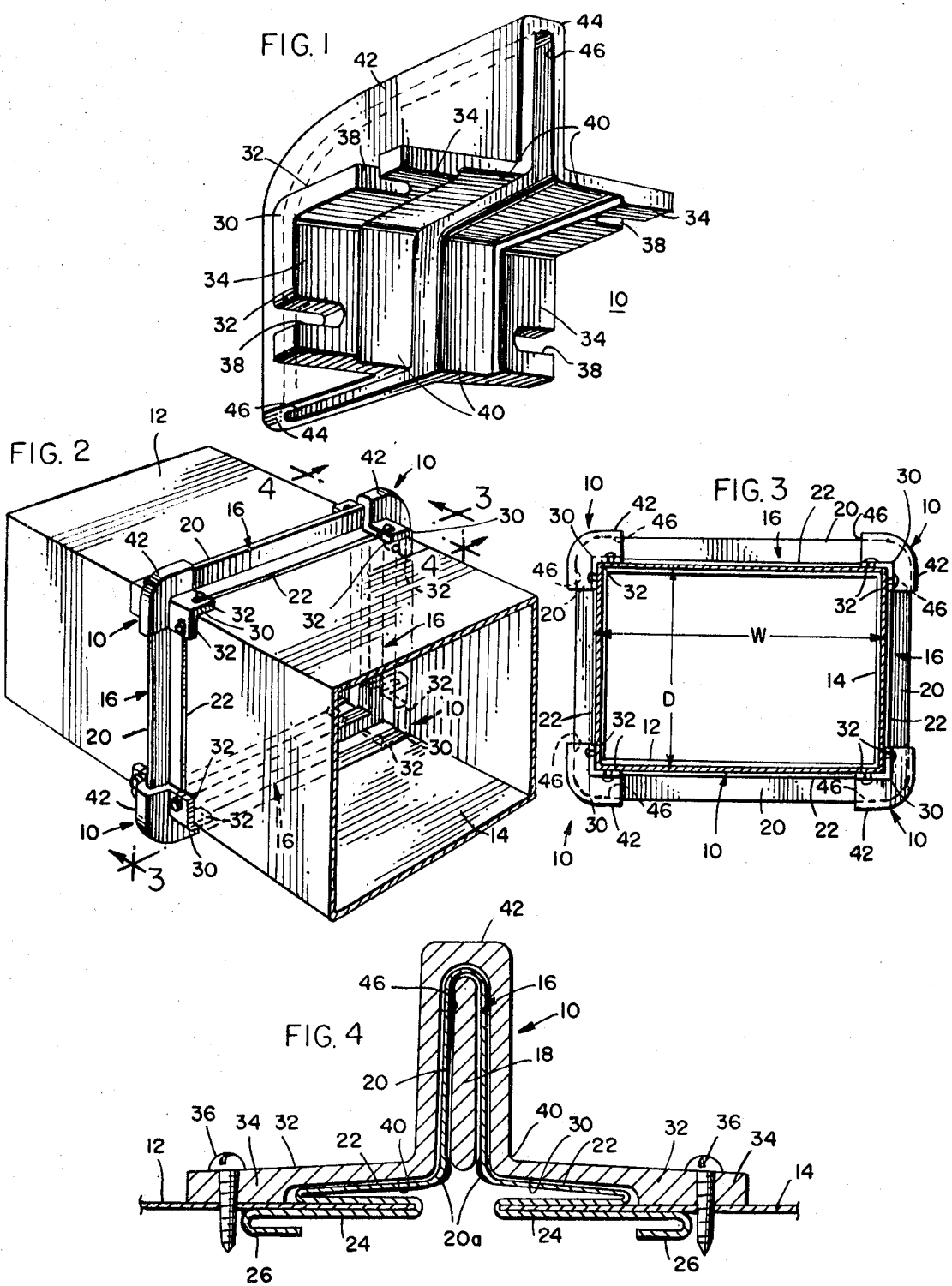

CORNER DEVICE FOR DUCT JOINTS

The present invention relates to a new and improved corner cap for use in connecting rectangular ducts in end-to-end relation. Heretofore, in connecting ducts together, slip joint connectors or cleats have been used to interlock the ends of the ducts. In most instances, the slip joints or cleats extend outwardly beyond the corner edges of the ducts and are then bent or folded downwardly against similar cleats on the intersecting transverse duct walls. In ducts wherein high velocity and high pressure fluid flow are present, it is sometimes necessary to provide for transverse stiffening at the connections or joints between adjacent duct sections and, in this case, T-shaped slip joint connectors having an outwardly projecting stiffening rib are provided. These stiffening ribs cannot easily be bent over or hammered down to provide needed corner support and, accordingly, other stiffening or support for the ducts at the corners is required in order to eliminate duct wall vibration and air leakage.

Accordingly, it is an object of the present invention to provide a new and improved corner cap for use in connecting rectangular ducts in end-to-end relation.

Another object of the invention is to provide a new and improved corner cap of the character described which substantially eliminates air leakage at the corners of the duct joints.

Still another object of the present invention is to provide a new and improved corner cap which provides physical strength at the duct corners to reduce wall vibration of the ducts or nonrectangular changes in cross-sectional shape of the ducts.

Another object of the present invention is to provide a new and improved corner cap of the character described which is especially adapted for use in connecting ducts in conjunction with slip joint connectors having a stiffening rib means therein extending outwardly of the duct walls.

The foregoing and other objects and advantages of the present invention are accomplished in an illustrated embodiment which comprises a corner cap for interconnecting ducts in end-to-end relation including angle means having a pair of flanges adapted to extend along intersecting walls of the ducts at the corners. Each flange is provided with opposite end portions which are adapted to be secured to an adjacent duct wall. Corner rib means is provided intermediate the ends of the angle means to extend outwardly of the flanges thereof away from the duct walls and aligned along the joints between the connected duct sections. Recesses for receiving the outer end portion of a slip joint connector are formed in the corner rib means, which rib means provides a structural continuation around the corner of the duct to prevent change in shape to nonrectangular cross section.

For a better understanding of the invention, reference should be had to the following detailed description when taken in conjunction with the drawings, in which:

FIG. 1 is a perspective view of a new and improved corner cap constructed in accordance with the features of the present invention;

FIG. 2 is a perspective view of a pair of rectangular ducts shown connected in end-to-end relation with slip joint connectors and corner caps of the present invention;

FIG. 3 is a transverse cross-sectional view taken substantially along line 3—3 of FIG. 2; and FIG. 4 is an enlarged, fragmentary, sectional view of the corner cap taken substantially along line 4—4 of FIG. 2.

Referring now more particularly to the drawings, therein is illustrated a new and improved corner cap constructed in accordance with the features of the present invention and illustrated generally by the reference numeral 10. The corner cap 10 is adapted for use in connecting together a pair of rectangular cross-sectional duct sections 12 and 14 in end-to-end relation at a transverse joint. The duct sections 12 and 14 may be of the high velocity or high pressure type wherein a loss or leakage of fluid at the joints and at the corners must be minimized and vibration or noise, because of the high velocity fluid flow, is likewise to be kept at a minimum. The corner caps 10 provide for reducing air leakage at the corners of the duct joint in addition to providing mechanical strength or structural stiffening of the duct to prevent nonrectangular cross section. The corner cap 10 is used in conjunction with a plurality of slip joint connectors which are used to interlock and interconnect opposite end portions of the respective sidewalls of the duct sections 12 and 14, as best shown in FIG. 4.

The slip joint connectors 16 are of a generally T-shaped configuration, as shown in FIG. 4, and may employ an inside stiffening rib or bar 18 of relatively thick metal to provide added strength at the joint connection. The stiffening bar 18 is encased within an outwardly extending, inverted, U-shaped rib casing 20 and, together, the casing and stiffening bar provide increased transverse structural strength for the duct along transverse joints between the adjacent duct sections 12 and 14. The slip joint connectors 16 are formed with oppositely, outwardly extending S-shaped flange portions 22 in order to provide an interlocking connection with the adjacent ends of the sidewalls of the duct sections 12 and 14, as shown in FIG. 4.

Each of the S-shaped flange portions 22 includes a relatively wide underlying base 24 having a re-entrant U-shaped flange 26 along the outer edge. The underlying base 24 and the intermediate leg of the S-shaped flange portion provides a pocket for receiving the edge portions of the duct walls as shown in FIG. 4. The stiffening bar 18 may be retained by fasteners within the rib casing 20 of the slip joint connector or may be simply slid into position within the casing and retained therein by upsets or dimples 20a at the lower edge of the casing walls.

Prior to installation of the corner caps 10, the adjacent facing end portions of the duct sections 12 and 14 are aligned, and pairs of the slip joint connectors 16 are cut to lengths equal to the transverse dimensions of the duct ("W" and "D," respectively, FIG. 3). The slip joint connectors are moved longitudinally into place to interlock together the adjacent edges of the duct walls. These edge portions are seated within the pockets provided in the S-flange portions 22 of the slip joint connectors, as previously described and shown in FIG. 4.

In accordance with the present invention, the corner caps 10 include longitudinally extending corner angle portions 30 adapted to extend longitudinally along the corners of the duct across and on both sides of the transverse joint between the duct sections 12 and 14. The corner angle portion 30 includes a pair of flanges 32 which are adapted to parallel the intersecting right angle walls of the duct sections. Each flange 32 includes a pair of outer end portions 34 having an inside surface adapted to be secured to the adjacent duct wall by suitable means, such as self-fastening sheet metal screws 36 (FIG. 4), which extend through slots 38 or holes provided in the flanges. Inwardly of the outer end portions 34, each flange 32 is formed with a recess 40 for receiving an outer end portion of the S-flanges 22 of a slip joint connector 16. As best shown in FIG. 1, the recesses 40 are formed on the duct facing, inside surfaces of the flanges 32 and extend across on both sides of the transverse joint between the duct sections.

In accordance with the present invention, the corner cap 10 includes a corner rib 42 extending outwardly of and at right angles to the corner angle portion 30 intermediate and midway between the end portions 34. The corner rib extends outwardly from the outside surfaces of both angle flanges 32 and provides transverse stiffening for the duct and corner cap. The corner rib 42 is positioned to lie on the transverse joint plane substantially co-extensive with the junction of the duct sections 12 and 14. The corner rib is formed with a pair of end faces 44 at right angles to each other, which faces lie on planes co-extensive to the outer longitudinal edges of the angle flanges 32. In order to receive an outer end portion of a stiffening rib 18 and the enclosing rib casing 20 of an in place slip joint connector 16, the corner rib 42 of the corner cap is formed with a pair of rib end receiving recesses 46 which extend inwardly from the respective outer end faces 44. The pair of recesses 46 transversely bisect the inside recesses 40 formed in the angle flanges 32 and, together, form a pair of T-shaped slots at right angles to each other for receiving the generally T-shaped cross-sectioned slip joint connectors 16, as best indicated in FIGS. 1 and 4. Both of the recesses 46 in a corner cap are on a common plane extending transversely of the duct substantially co-extensive with the joint between duct sections. The corner ribs 42 of the corner caps 10 and the stiffening ribs 40 of the slip joint connectors 16 cooperate to provide a sturdy, rectangular, transverse support for the duct at the joint between duct sections 12 and 14.

It will thus be seen that the corner caps 10, constructed in accordance with the present invention, are especially well suited for use with slip joint connectors having transversely outwardly extending stiffening ribs, and the corner caps provide a neat appearance and help seal the duct corners in addition to providing mechanical strength and stiffening for the duct along the transverse joint between connected sections. The corner caps may be formed by casting or may be constructed of sheet metal, for example, 18-24 gauge galvanized or cold rolled steel.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A corner cap for use with a pair of elongated slip joint connectors for interconnecting the ends of a pair of rectangular duct sections in end to end relation, said cap including a corner angle having right angle flanges extending longitudinally along a corner of said duct sections in opposite directions transversely of said slip joint connectors, each of said flanges including an inside surface with a pair of spaced apart outer end portions adapted to abut and be secured to an adjacent duct wall, said outer end portions defining opposite ends of first recesses formed between said inside surfaces of said flanges and said duct walls and open along outer edges of said flanges for receiving the ends of said slip joint connectors; said cap including a rib extending transversely outward of said flanges and spaced between opposite ends thereof, said rib having a pair of opposite outer end faces at right angles and each aligned with an outer edge of one of said flanges, a pair of second recesses defined in the opposite end faces of said rib for receiving the ends of said slip joint connectors, each second recess intersecting and normal to a first recess for forming a T-shaped slot for receiving the end portion of one of said slip joint connectors.

2. The corner cap of claim 1 wherein each of said first recesses includes an inner end face in substantial alignment with a corner of the ducts and a wall thereof for limiting travel of said slip joint connectors transversely of said ducts.

3. In combination, an assembly for interconnecting the ends of a pair of rectangular duct sections in end to end relation comprising one or more elongated slip joint connectors having side flanges on opposite sides for engaging and connecting end portions of adjacent duct walls of said pair of duct sections, said slip joint connectors including upstanding stiffening ribs extending outwardly of said flanges and normal thereto; a corner cap including a corner angle having right angle flanges extending longitudinally along a corner of said duct sections in opposite directions transversely of said slip joint connectors, at least one of said flanges including an inside surface having a pair of opposite end portions spaced on opposite sides of a slip joint connector adapted to abut and be secured to an adjacent duct wall, said outer end portions defining opposite ends of a first recess formed between said inside surface and said walls of said duct sections and open along an outer edge to receive the ends of said side flanges of said slip joint connector, said cap including a corner rib extending transversely outwardly of said corner angle flanges spaced between opposite ends thereof, said corner rib having a pair of opposite end faces at right angles and aligned with an outer edge of said corner flange, a second recess defined in said corner rib intersecting and normal to said first recess forming a T-shaped slot for receiving the end portion of said slip joint connector.

* * * * *